United States Patent [19]
Ellis

[11] 4,269,475
[45] May 26, 1981

[54] HEAD-UP DISPLAYS

[75] Inventor: Stafford M. Ellis, East Preston, England

[73] Assignee: Elliott Brothers (London) Limited, Chelmsford, England

[21] Appl. No.: 81,455

[22] Filed: Oct. 3, 1979

[30] Foreign Application Priority Data

Oct. 5, 1978 [GB] United Kingdom ............... 39472/78

[51] Int. Cl.³ ............................................. G02B 27/14
[52] U.S. Cl. ....................................... 350/174; 434/44
[58] Field of Search ............... 350/174, 3.65, 162 ZP, 350/286, 3.72; 35/12 R, 12 B

[56] References Cited
U.S. PATENT DOCUMENTS 2,470,912  5/1949  Best et al. ............................. 350/174
4,099,841  7/1978  Ellis ..................................... 350/174

Primary Examiner—John K. Corbin
Assistant Examiner—B. Wm. de los Reyes
Attorney, Agent, or Firm—Kirschstein, Kirschstein, Ottinger & Cobrin

[57] ABSTRACT

A display head for an aircraft head-up display system wherein a display developed by a projector (11) is reflected to the observer in part by a semi-reflective coating (31a) on the side (29a) of the combiner light transmissive body (27) nearer the observer, and in part by a semi-reflective coating (31b) on the side (29b) of the combiner body further from the observer, the two coatings being positioned relative to one another and the projector to provide the observer with an uninterrupted instantaneous field of view of the display.

4 Claims, 3 Drawing Figures

HEAD-UP DISPLAYS

This invention relates to display heads for aircraft head-up display systems.

A display head for an aircraft head-up display system (hereinafter referred to as a display head of the kind specified) comprises an optical projector and an image combiner through which an observer, generally the pilot of the aircraft, can view a distant scene and from which a collimated optical image developed by and projected from the optical projector is reflected to the observer. The optical image appears to the observer as a virtual image "at infinity", and being, as it were, superimposed on the distant scene, such image can be viewed by the observer without demand for ocular accommodation.

The classical combiner i.e. a mono-combiner consists of a single body of light transmissive material the two functionally operationally active major surfaces of which are optically flat, and, in principle at least, parallel to one another, although sometimes, to correct for windscreen curvature, a small curvature is given to that major surface which is closer to the windscreen. The preferred transmissive material is normally glass on account of its satisfactory mechanical properties. The required reflectivity is provided by a semi-reflective coating on one major surface of the body, normally the major surface nearer the observer.

There is a continuous pressure from users to provide larger fields of view than were formerly regarded as adequate and satisfactory and a number of proposals have been made to satisfy such demands. Some such proposals have included combiners composed of two or more spaced parallel combiner elements. Others have called for the provision of holographic or multiple coatings. Reference may be made to U.S. Pat. Nos. 3,936,148; 3,940,204 and 4,099,841 for a better understanding of such proposals.

Each of the aforementioned prior proposals has its merits; but equally, each calls for a significant change in technology and carries, at the present time at least, technical risks not present in the classical mono-combiner head-up display. They all have virtues but these virtues are not always capable of being utilized in specific given environments. In particular the geometrical or ergonomic constraints of modern military aircraft cockpits often militate against the use of particular designs.

It is therefore still desirable to extend as far as practicable the classical mono-combiner design; there are occasions where a low technical risk, relatively inexpensive design is required which, at the same time, provides a good field of view for the observer.

It is a common requirement, that the combiner should serve not only as a display element but also give to the observer, using the display, a measure of protection against the consequences of air blast or bird strike. The observer is to be given some degree of protection at separation, of the aircraft canopy, deliberate or accidental, or against the ingress of objects such as birds, through the canopy, and against the accompanying air blast.

The present invention is able profitably to exploit the demand for such protection in satisfying the call for enlarged field of view.

According to the invention in a display head of the kind specified the combiner comprises a single body of light transmissive material inclined towards the observer's viewing position whose major surface nearer said viewing position has a coating which covers an area extending from the transverse edge of said body further from said viewing position to a transverse boundary intermediate the transverse edges of said body nearer and further from said viewing position, and whose major surface further from said viewing position has a coating covering an area extending from said transverse edge of said body nearer said viewing position to a transverse boundary intermediate said transverse edges; each of said coatings being effective to reflect light incident thereon from the optical projector and to transmit light incident thereon from the distant scene towards said viewing position; and said boundaries of the coatings being so disposed with respect to one another and with respect to the projector that the observer has an uninterrupted field of view of the image developed by said projector, the contribution to the field of view of each coating being contiguous with the contribution to the field of view of the other coating.

In a sense, the invention as above stated, utilizes the thickness of the single body of light transmissive material so as to achieve in a convenient manner some of the advantages vis a vis field of view, of a combiner composed of two spaced combiner elements. Structurally the display head is very sound; complete harmony and parallelism between the two coatings is assured. The greater the thickness of the body the greater the enhancement of the available field of view and the greater the ability of the display head to act as a protective member for the observer.

One embodiment of the invention is hereinafter described by way of example with reference to the accompanying drawings in which.

Figure 1:
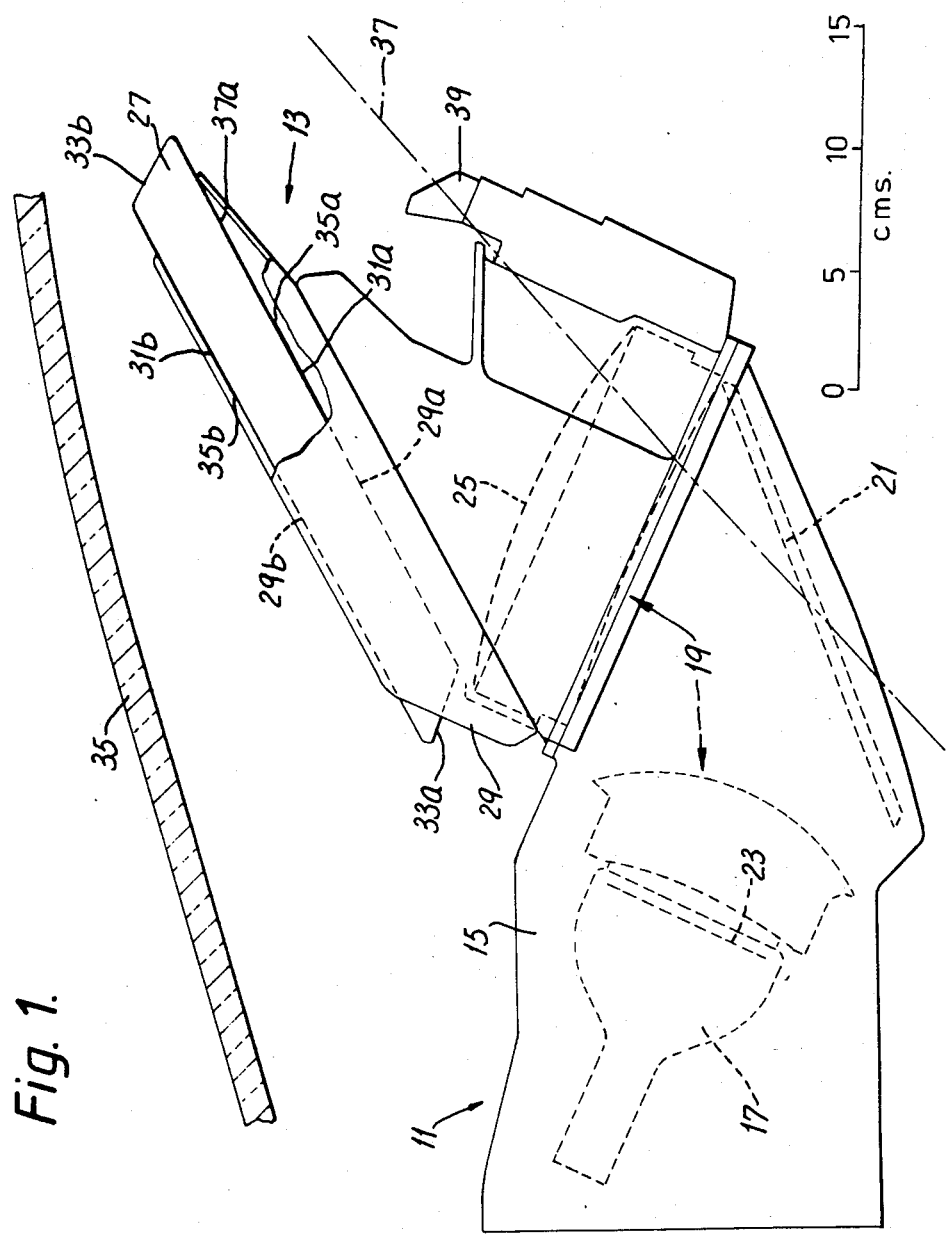
FIG. 1 shows, to the scale represented, a schematic side elevational view of the display head.
Figure 2:
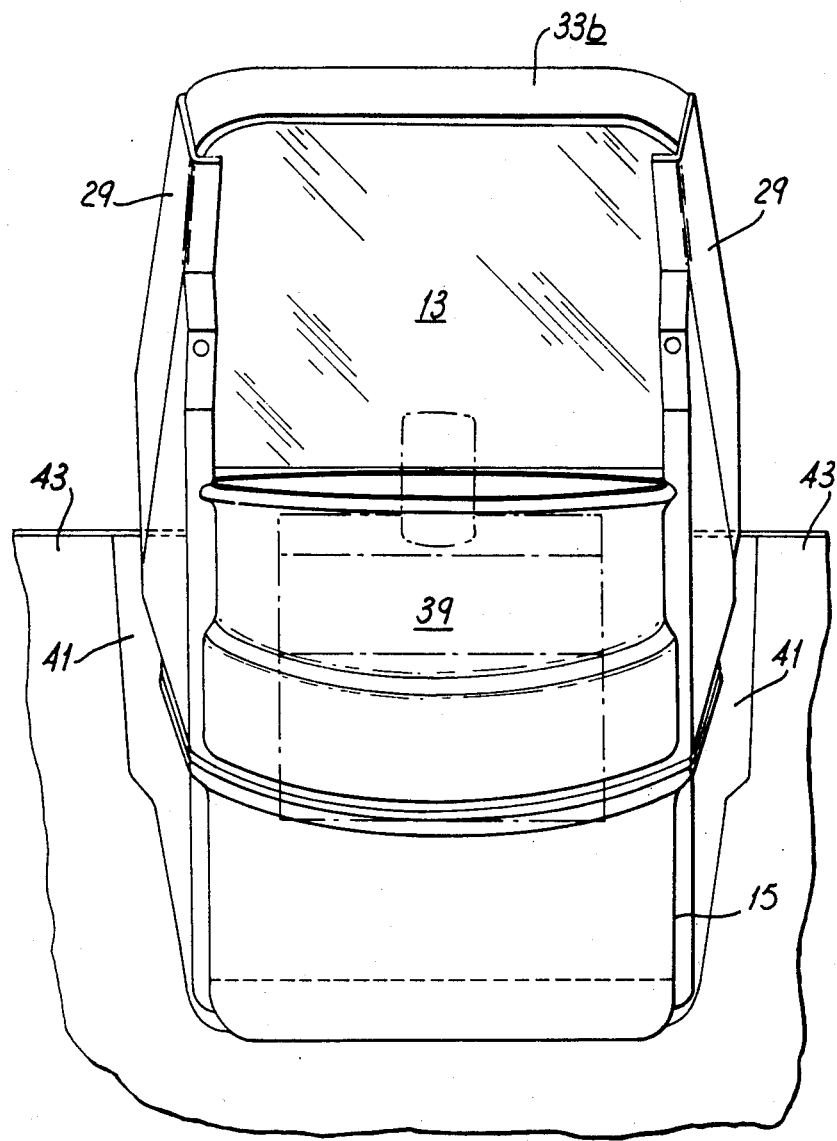
FIG. 2 shows to the same scale a view of the display head from the design eye position; and, FIG. 3 is a representation of the fields of view available to an observer using the display.

Referring to FIGS. 1 and 2, the display head has an optical projector 11 and an image combiner 13. The projector 11 has a housing 15 containing inter alia, a cathode ray tube 17 and a collimating optical system 19. An image erection element 21, i.e. a mirror or prism, deflects light from the screen 23 of the cathode ray tube 17 to the combiner 13 by way of the final or exit lens 25 of the optical system 19.

The combiner 13 comprises a body of glass 27 disposed between the aircraft canopy 35 and an observer's viewing position and supported at its side edges by side arms 29. The side arms 29 extend upwards and rearwards i.e. towards the observer's viewing position from the housing 15 from positions adjacent to the final lens 25 of the optical system 19.

The display head is rigidly supported by a mounting tray (not shown) with respect to the airframe.

The glass body 27 of the combiner 13 has two major optically flat and parallel surfaces 29a and 29b one of which 29a is rearwards facing, and the other of which 29b is forwards facing. Each of the surfaces 29a and 29b has a neutral density semi-reflective optical coating. The coating 31a of the rearwards facing surface 29a, that is the major surface closer to the observer's viewing position, extends from the bottom edge 33a of the glass body 27 (i.e. the edge further from the observer) to a transverse boundary 35a intermediate the bottom edge 33a and the top edge 33b of the body 27 (i.e. the edge nearer the observer). Similarly the coating 31b of the forwards facing surface 29b, that is the major surface further from the observer's viewing position, extends from the top edge 33b of the body 27 to a transverse boundary 35b intermediate the top and bottom edges 33b, 33a of the body 27.

The design and disposition of the display head are with respect to a design eye position to the right of the combiner 13 as shown in FIG. 1. The display head must be accommodated within a space of which the upper bound is the canopy 35 and the lower bound is defined by an ejection line 37. The obscuration of instrument panel space 43 (see FIG. 2) to each side of the display head is kept as small as possible.

The reflectivity/transmissivity characteristic of the coatings 31a and 31b are of the general order 25% reflectivity, 75% transmissivity. The relative positions of the coating boundaries 35a and 35b and the geometrical relationship of the combiner 13 to the projector 11, particularly the final lens 25 thereof, are such that collimated light incident on the coating 31a is reflected in part, by the coating 31a directly to the observer's viewing position. In addition, collimated light incident on the uncoated portion 37a of the rearwards facing surface 29a of the body 27 i.e. above the boundary 35a is, after refraction at the surface portion 37a, transmitted by the glass body to the coating 31b. After reflection at the latter coating 31b the light is again refracted at the surface portion 37a and thereafter passes to the viewing position.

Light from the distant scene is received at the viewing position after transmission through the coating 31a or 31 b or before refraction by the glass body 27.

The field of view at the viewing position is continuous, i.e. there is no gap between light reflected at the two coatings 31a and 31b.

To this end, the positions of the boundaries 35a, 35b must of course be carefully determined, as by ray tracing.

Figure 3:
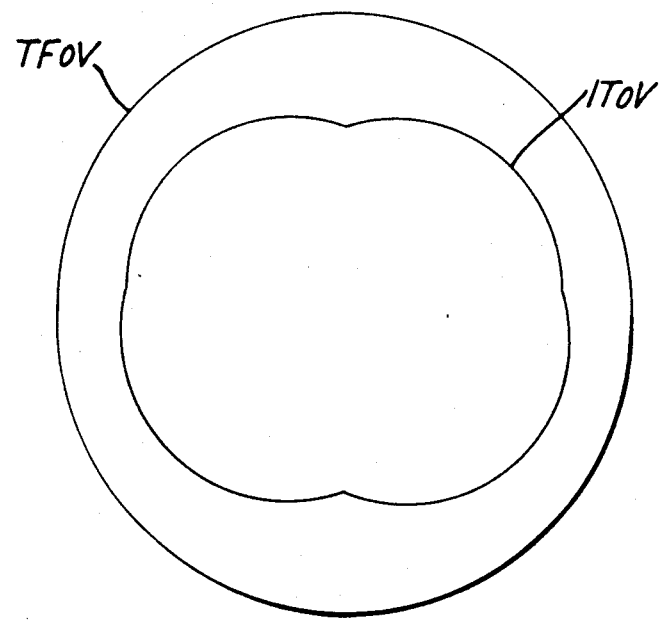

The instantaneous and total fields of view IFOV and TFOV at the design eye position are shown in FIG. 3, the instantaneous field being subtending an angle of 19½° in azimuth and 16° in elevation and the circular total field subtending an angle of 25°. The instantaneous field of view using a comparable conventional combiner in which the rearwards facing surface only of the glass body is provided with a semi-reflective coating may be shown to be approximately 2° less than that depicted both in azimuth and in elevation. The instantaneous field of view of the embodiment depicted is, moreover, compared with that of a comparable single coating combiner, appreciably more nearly rectangular. Accordingly, a very substantial benefit is achieved as a result of the invention.

The embodiment shown has, additionally, a camera 39 for recording the events displayed; and there is ample room for the provision of a standby sight, although this is not shown in the drawings.

The "shadow" cast by the display head from the design eye position is indicated at 41 in FIG. 2. This, effectively, represents the loss of availability of panel space for other aircraft instruments.

I claim:

1. A display head for an aircraft head-up display system comprising an optical projector and an image combiner through which an observer can view a distant scene and from which a collimated optical image developed by and projected from the optical projector is reflected to the observer wherein the combiner comprises a single body of light transmissive material inclined towards the observer's viewing position whose major external surface nearer said viewing position has a coating which covers an area extending from the transverse edge of said body further from said viewing position to a transverse boundary intermediate the transverse edges of said body nearer and further from said viewing position, and whose major external surface further from said viewing position has a coating covering an area extending from said transverse edge of said body nearer said viewing position to a transverse boundary intermediate said transverse edges; each of said coatings being effective to reflect light incident thereon from the optical projector and to transmit light incident thereon from the distant scene towards said viewing position; and said boundaries of the coatings being so disposed with respect to one another and with respect to the projector that the observer has an uninterrupted field of view of the image developed by said projector, the contribution to the field of view of each coating being contiguous with the contribution of the field of view of the other coating.

2. A display head according to claim 1 wherein said body is arranged so that its upper edge constitutes said transverse edge nearer the observer's viewing position.

3. A display head according to claim 1 wherein each said coating has a reflectivity/transmissivity characteristic of substantially 25% reflectivity and 75% transmissivity.

4. A display head according to claim 1 wherein said body consists of glass.

* * * * *